United States Patent [19]

Pflum

[11] Patent Number: 4,872,476
[45] Date of Patent: Oct. 10, 1989

[54] CHECK VALVE FOR ENGINE COOLING SYSTEM

[75] Inventor: Robert P. Pflum, Indianapolis, Ind.
[73] Assignee: Caltherm Corporation, Columbus, Ind.
[21] Appl. No.: 197,955
[22] Filed: May 24, 1988
[51] Int. Cl.$^4$ ............................................. F16K 15/06
[52] U.S. Cl. .................................. 137/513.5; 137/519; 137/528
[58] Field of Search ................ 137/513.5, 519, 533.21, 137/528

[56] References Cited

U.S. PATENT DOCUMENTS

| | | | |
|---|---|---|---|
| 145,878 | 12/1873 | Kraft | 137/533.21 |
| 522,253 | 7/1894 | Gold | 137/519 |
| 1,795,077 | 3/1931 | Crowley | 137/519 X |
| 2,775,363 | 12/1956 | Taylor | 137/519 X |
| 2,902,044 | 9/1959 | Sherer | 137/519 X |
| 3,861,415 | 1/1975 | Larsen | 137/513.5 |
| 4,570,669 | 2/1986 | Pauliukonis | 137/528 |

*Primary Examiner*—Robert G. Nilson
*Attorney, Agent, or Firm*—Lane & Aitken

[57] ABSTRACT

A check valve for an engine cooling system includes opposite ports and a venting plug press fit in one of the ports. The venting plug defines an opening which allows fluid flow through the valve, and a jiggle pin is positioned in the opening. The jiggle pin has a head on one side of the venting plug for sealing the opening, an anchor on the opposite side for retaining the jiggle pin in the opening and a neck connecting the head with the anchor. A bleed notch is defined in a periphery of the opening to permit restricted fluid flow past the venting plug, even when the head of the jiggle pin is sealed. The ends of the check valve have external threads and different diameters for securing the valve in different size opening, and the venting plug can be press fit into its port in either of two orientations so that either the anchor or the head is positioned between the venting plug and the end of the valve.

11 Claims, 2 Drawing Sheets

CHECK VALVE FOR ENGINE COOLING SYSTEM

BACKGROUND OF THE INVENTION

The present invention relates to a check valve for an engine cooling system and more particularly to a check valve which is inserted in the cooling system to ensure positive venting of air out of the system.

Check valves are known which are secured in an opening in a high point of a cooling system for an engine, such as near the top of a radiator, in an auxiliary tank, or in some other point. The check valve typically includes a body, a reduced internal diameter portion in the body to prevent the ball element from dropping out of the body and into the cooling system, a retaining element for capturing the ball element in the valve body between the retaining element and the portion of reduced internal diameter and a ball element in the body, and some structure, such as screw threads, for securing the check valve in the opening. The retaining element includes an opening and a seat for the ball element defined around the opening, so that, when the system is under pressure, fluid pressure forces the ball element against its seat to prevent the loss of fluid from the system and/or the bypass of fluid around the radiator.

The check valve has the drawback that special provision must be made in the valve body for a reduced diameter portion which is small enough to prevent the ball element from leaving the chamber defined by the reduced internal diameter portion and the retaining member. In addition, there is often air in the cooling system which does not move to the top when the system is idle or being filled, but only when the engine is in operation and the cooling system is under pressure. Where the system employs the known check valves, the air is prevented from escaping the system when the engine is running since the ball element is seated, preventing the passage of all gases and liquids. Furthermore, the ball elements in some valves become stuck in their seated position, thereby preventing venting of the cooling system at all times, even when the system is not under pressure, such as during filling of the system.

In some applications, it is desirable for the check valve to control flow in the opposite direction or to be installed in a cooling system opening having a different diameter. Conventional cooling system check valves have no flexibility for such purposes. Moreover, these known check valves must be in a substantially vertical orientation in order to operate properly.

SUMMARY OF THE INVENTION

By the present invention, the need for providing a reduced internal diameter portion in a body of the check valve is eliminated and, as a result, a simpler, less expensive fitting, such as a nipple having a hex portion to receive a wrench, can be used as the body of the check valve. This is made possible by the use of a jiggle pin, rather than a ball, as the valve element, the jiggle pin being secured in an opening of a venting plug, which is press fit in one end of the check valve body.

The jiggle pin includes a head, which seals against a seat around the opening in the venting plug, an anchor located on the opposite side of the opening from the head, and a neck extending through the opening and connecting the head and the anchor. The anchor has a dimension greater than the diameter of the opening to prevent the jiggle pin from separating from the venting plug and travelling through the cooling system. No reduced diameter portion is needed in the valve body to retain the jiggle pin in the valve body.

A bleed notch is formed in one side of the venting plug opening so that, even when the jiggle pin is seated, air coming to the top of the cooling system can bleed out. In the event that the jiggle pin becomes stuck on its valve seat, venting of the system still occurs through the bleed notch.

In most cases, the venting plug is press fit into an end of the valve body so that an annular flange of the venting plug, which defines a cup in which the sealing portion of the jiggle pin is located, is positioned in the valve body internally of an end wall of the venting plug in which the opening is defined. However, the venting plug can be press fit into the valve body in the opposite direction so that the cup defined by the venting plug faces the end of the valve body in which the venting plug is inserted. In this way, the check valve can act in the opposite direction.

As another variation, the venting plug can be press fit into the valve body in the second direction and, since the hex nipples typically include threaded ends having different outer diameters from one another, the opposite end can be secured into the opening of the cooling system. In this way, one check valve can be installed in openings having either of two standard sizes and, thus, can be used in a greater number of cooling systems and can be installed in a greater variety of installation locations within a cooling system. When both the insertion of the venting plug in the valve body and the insertion of the valve body in the cooling system opening are reversed from the first described arrangement, the check valve will control flow in the same direction as in the first described arrangement.

The shank portion of the jiggle pin guides the sealing portion to the seat in the opening of the venting plug when the cooling system is pressurized. As a result, the check valve according to the present invention can be installed in non-vertical orientations, including a horizontal orientation, as well as a substantially vertical orientation.

BRIEF DESCRIPTION OF THE PREFERRED EMBODIMENT

DETAILED DESCRIPTION OF THE PREFERRED EMBODIMENT

Figure 1:
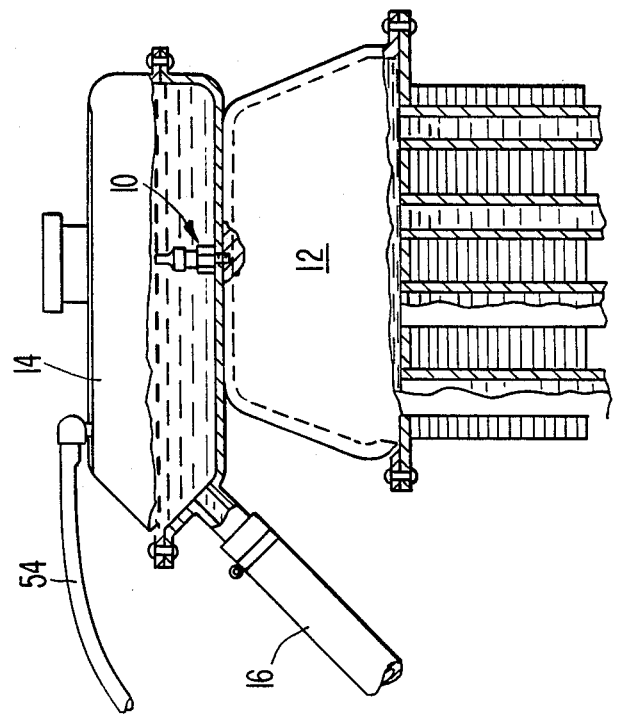
FIG. 1 shows the check valve according to the present invention installed in the cooling system of an engine.
Figure 3:
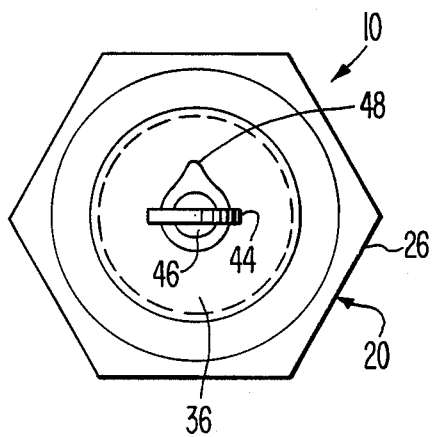
FIG. 3 is a top view of the check valve of FIG. 2, but with the cap removed and the jiggle pin rotated about 90°.

The check valve 10 according to the present invention is illustrated in FIG. 1 in one possible location in a vehicle engine cooling system, such as the type of cooling system used in diesel truck engines. The cooling system includes a radiator 12, an auxiliary tank 14 mounted on the radiator 12, and return line 16 connecting the auxiliary tank 14 with a fill line (not shown) for the engine cooling system.

Figure 2:
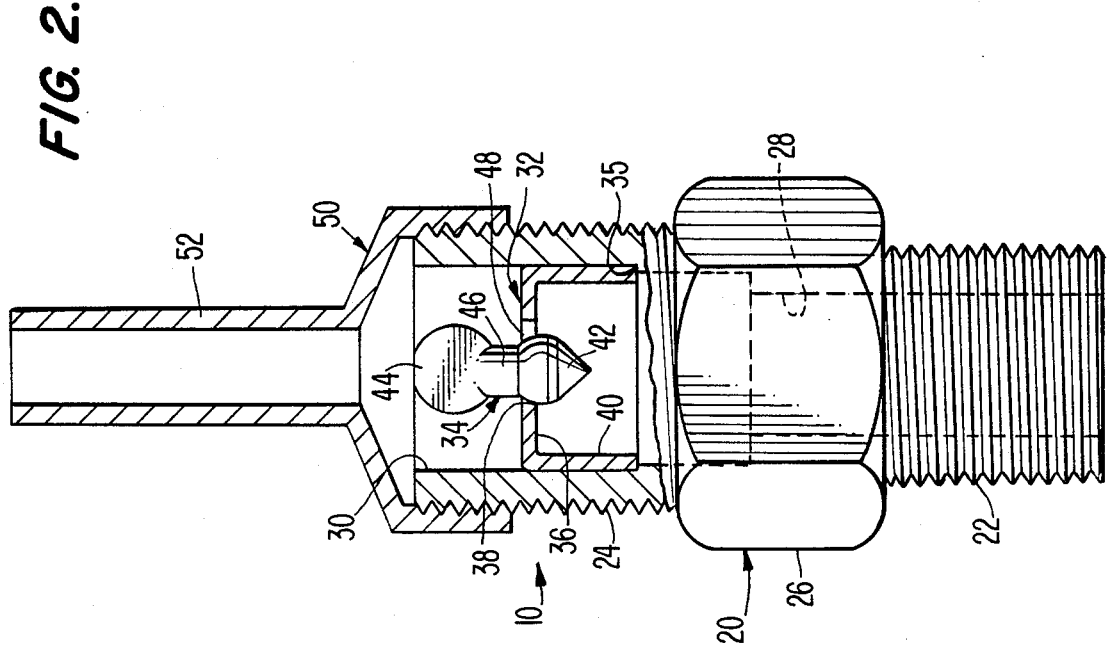
FIG. 2 is a front elevation, with parts in cross section, of a check valve according to the present invention in a vertical orientation, the jiggle pin being seated.

As can be seen from FIG. 2, the check valve 10 includes a check valve body 20 which can be a simple reducing nipple having two opposite, externally threaded ends 22 and 24 of different diameters and, between the ends, a central hex portion 26 which permits the check valve 10 to be screwed into and out of threaded openings, such as a threaded opening in the bottom of the auxiliary tank 14. The smaller threaded end 22 defines a port 28 having a first internal diameter, shown in dashed lines in FIG. 2, and the larger threaded end 24 defines a port 30 having a larger internal diameter.

A venting plug subassembly, which includes a venting plug 32 and a valve element in the form of a jiggle pin 34, is press fit into the port 30 in the larger threaded end 24. The port 30 is reamed to a predetermined depth to form a bore having a precise dimension for a proper press fit. The reaming also leaves a shoulder 35 between the reamed and unreamed portions of the port 30, which serves to stop the insertion of the venting plug at the desired depth.

The venting plug 32 is cup-shaped, having a bottom wall 36 defining a central opening 38 and an annular side wall 40 extending from the bottom wall 36 farther into the check valve body 20. The jiggle pin 34 includes a head 42 connected to an anchor 44 by a neck 46. Before the jiggle pin 34 is connected with the venting plug 32 to form the venting plug subassembly, the anchor 44 of the jiggle pin 34 can have a barrel shape or other shape which fits through the central opening 38 in the venting plug 32. After the anchor 44 is inserted through the central opening, it is flattened into, for example, a disk shape, which has at least one transverse dimension greater than the diameter of the opening 38 in the venting plug 32 and the depth of a bleed notch to be described hereinafter so that the jiggle pin 34 cannot separate from the venting plug 32. The flattened anchor 44 is sized and shaped so that it covers only a small portion of the opening 38, whereby that the fluid can pass through the opening when the anchor 44 is positioned cross the opening. The head 42 has a sealing surface of, for example, spherical shape, to essentially seal the opening 38 in the venting plug 32 and prevent the flow of fluid when the head 42 is positioned across the opening 32, engaging its seat around the opening. It is contemplated that the venting plug 32 can be made from brass and the jiggle pin 34 from stainless steel, but other suitable materials may also be employed.

A bleed port extends through the venting plug 32 in the form of a bleed notch 48 in the periphery of the opening 38, the bleed notch 48 defining an enlargement in one portion of the opening. Although the sealing surface of the head 42, when seated in the opening 38, blocks fluid flow through the opening, fluid is allowed to bleed out of the cooling system through the bleed notch 48, which is not obstructed by the sealing surface of the head 42 of the jiggle pin 34. The venting plug subassembly is pressed into the bore 30 of the larger end 24 of the check valve body 20 to a depth such that, when the head 42 of the jiggle pin 34 is seated in the opening, the anchor 44 of the jiggle pin 34 is entirely within the bore 30. This arrangement protects the jiggle pin 34 from damage due to outside forces. In use, the jiggle pin 34 is ordinarily further protected by a threaded cap 50 which is screwed onto the larger end 24 of the valve body 20. The cap includes an elongate axially extending tube 52 which defines an outlet passage for fluid vented from the cooling system. The tube 52 extends vertically into the auxiliary tank 14 and determines the level of liquid coolant that can accumulate in the auxiliary tank 14 without flowing back through the check valve 10.

Although the illustrated embodiment shows the venting plug assembly with the annular wall 40 extending inward from the bottom wall 36, the venting plug assembly can be reversed and pressed into the bore 30 of the larger end 24 so that the annular wall 40 extends outward from the bottom wall 36 which is adjacent to the hex portion 26 of the valve body 20. In this arrangement, the check valve 10 checks the flow of fluids in the opposite sense from the illustrated embodiment when the check valve is mounted the same way as the check valve 10 of the illustrated embodiment. As an alternative, in the unillustrated embodiment, the larger end 24 can be screwed into an opening of the cooling system of the engine, in which case the check valve operates in the same way as the illustrated embodiment. Thus, a single check valve body 20 can be used to produce check valves 10 usable in engine cooling system fittings of two different sizes.

The cooling system is normally filled when the engine is not running, so that the sealing surface on the head 42 of the jiggle pin 34 is not seated but instead hangs below the seat defined around the central opening 38 in the bottom wall 36 of the venting plug 32. In this position, the anchor 44 of the jiggle pin 34 engages the bottom wall 36, since the anchor is wider than the central opening 38, thereby preventing the jiggle pin 34 from separating from the venting plug 32 and falling through the check valve body 20 into the radiator 14.

When the cooling system is filled through the fill line, the level of coolant rises in the radiator 12, forcing air in the system to the top of the radiator. Since the jiggle pin 34 is unseated, the air at the top of the radiator 12 flows through the check valve 10 into the auxiliary tank 14 from which it can escape to the atmosphere, for example, through a hose 54 (FIG. 1).

When the engine is running, the pressure of the fluid in the cooling system force the sealing surface on the head 42 of the jiggle pin 34 into contact with its seat around the central opening 38 in the venting plug 32. Despite this, air in the cooling system which did not escape during filling can still escape through the bleed notch 48. Of course, a small amount of coolant will also flow through the bleed notch 48 into the auxiliary tank 14, but this is no problem since the coolant returns to the coolant circulation loop through the engine and the radiator 12 by way of the return line 16 and the fill line. Furthermore, the bypass of this small amount of coolant from the coolant circulation loop does not affect the cooling of the engine. Moreover, if the jiggle pin 34 becomes stuck in its seated position, the cooling system can still operate effectively, since air can still escape through the bleed notch 48, although filling will take longer.

Figure 4:
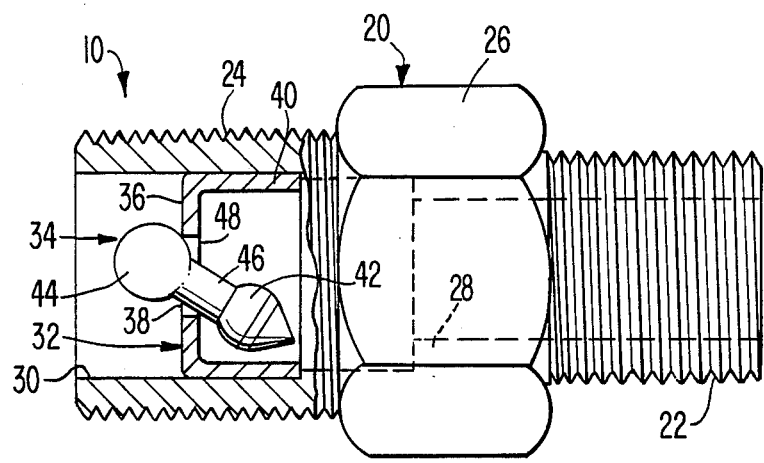
FIG. 4 is a front elevation, with parts in cross section, of a check valve according to the present invention in a horizontal orientation, the jiggle pin being unseated.

In some applications of the check valve, it is desirable for the check valve 10 to be oriented in a non-vertical position. As can be seen from FIG. 4, the check valve 10 according to the present invention can operate in non-vertical orientations, including a horizontal orientation. When there is no fluid pressure on the jiggle pin 34, the head 42 falls to the annular side wall 40 of the venting plug 32. When liquid flows under pressure into the check valve 10, the neck 46 of the jiggle pin 34 guides the sealing surface on the head 42 up to the seat defined around the central opening 38.

The invention may be embodied in other specific forms without departing from its spirit or essential characteristics. The present embodiment is, therefore, to be considered in all respects as illustrative and not restrictive, the scope of the invention being indicated by the claims rather than by the foregoing description, and all changes which come within the meaning and range of the equivalents of the claims are therefore intended to be embraced therein.

What is claimed is:

1. A check valve for use in a cooling system for an engine, comprising:
   a valve body having a first port and a second port;
   a venting plug positioned in one of said ports, said venting plug having an opening permitting fluid communication between said first and second ports and a valve seat surrounding said opening;
   a valve element for closing said opening in response to fluid pressure on said valve element, said valve element including a head having a sealing surface for engaging said valve seat, an anchor positioned on an opposite side of said venting plug from said head, and a neck extending through said opening and connecting said head to said anchor, said anchor extending across said opening to prevent separation of said valve element from said venting plug; and
   a bleed port extending through said venting plug, wherein said venting plug is secured in its port in a press fit.

2. The check valve of claim 1, wherein said valve body further has a first end and a second end opposite from said first end, said first and second ports being defined in said first and second ends.

3. The check valve of claim 2, wherein said first and second ends have external threads.

4. The check valve of claim 3, wherein said first end has a different diameter from said second end.

5. The check valve of claim 1, wherein said venting plug includes a bottom wall defining said valve seat and said opening, and an annular wall extending from said bottom wall, said annular wall engaging said valve body in said press fit.

6. The check valve of claim 1, wherein said anchor covers only part of said opening.

7. The check valve of claim 1, wherein said bleed port is a bleed notch defined in the periphery of said opening.

8. The check valve of claim 7, wherein said bleed notch is unobstructed by said valve element when said sealing surface on said head engages said valve seat.

9. The check valve of claim 7, wherein said anchor has a transverse dimension greater than the diameter of said opening and the depth of the notch combined.

10. The check valve of claim 1, wherein said anchor is entirely within its port when said head of said valve element is seated.

11. A check valve for use in a cooling system for an engine, comprising:
    a valve body having a first port and a second port;
    a venting plug positioned in one of said ports, said venting plug having an opening permitting fluid communication between said first and second ports and a valve seat surrounding said opening;
    a valve element for closing said opening in response to fluid pressure on said valve element, said valve element including a head having a sealing surface for engaging said valve seat, an anchor positioned on an opposite side of said venting plug from said head, and a neck extending through said opening and connecting said head to said anchor, said anchor extending across said opening to prevent separation of said valve element from said venting plug; and
    a cap secured over one of said ports, said cap including an axially extending tube defining an outlet passage for said check valve,
    wherein said venting plug is secured in its port in a press fit.

* * * * *